May 7, 1963 E. P. BULLARD III 3,088,335
MACHINE TOOL POSITIONING CONTROL
Filed July 16, 1959
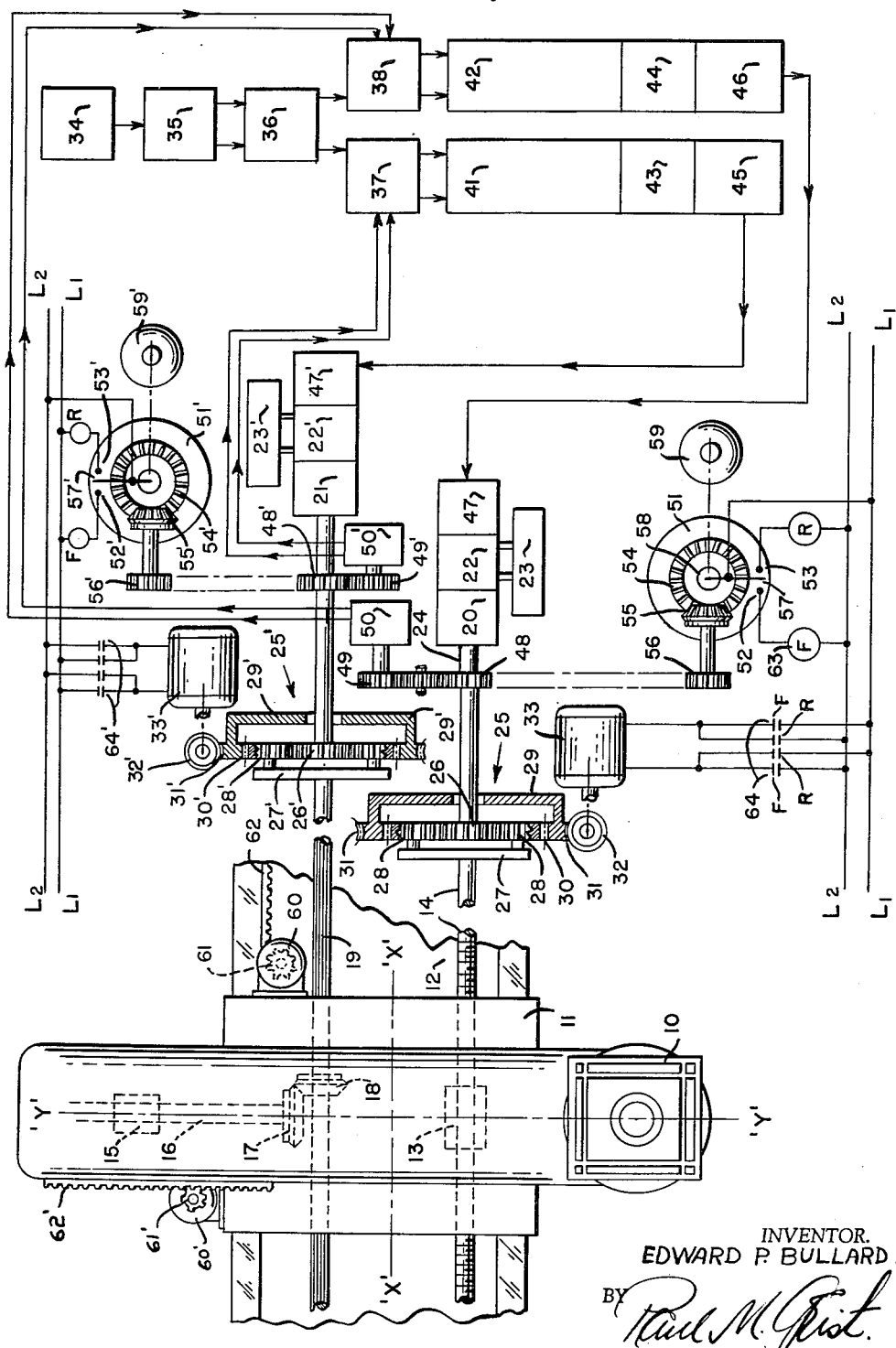
INVENTOR.
EDWARD P. BULLARD III
BY
ATTORNEY United States Patent Office 3,088,335
Patented May 7, 1963

3,088,335
MACHINE TOOL POSITIONING CONTROL
Edward P. Bullard III, Fairfield, Conn., assignor to The Bullard Company, a corporation of Connecticut
Filed July 16, 1959, Ser. No. 827,573
5 Claims. (Cl. 74—675)

The present invention relates to machine tool controls, and particularly to a new and improved arrangement of elements for reducing to a minimum the time of response of the tool head relative to the feedworks therefor.

In modern numerical tape controlled machines, the electrical accuracy of the electronic control is usually much higher than the mechanical accuracy of the machine to which it is applied, resulting in errors that are primarily inherent in the machine itself and which often exceed allowable tolerances. In order to overcome this difficulty, it has heretofore been proposed to redesign the machine tool so that it is far more rigid than standard tools, and to include substantially frictionless feeding means such as the well known "ball and nut" lead screw. The cost of numerical tape control, particularly that for continuous contouring, is extremely high, and such proposed arrangements make it necessary to apply this extremely costly numerical tape control to special machines, which latter cost far more than standard machines due to the extreme rigidity necessarily built into them as well as the costly ball and nut lead screw arrangement. One of the objections to this proposed approach is that in the final analysis the motion transmitting means and the accuracy imparting means are one and the same, so that errors subsequently developing in the motion transmitting means affect the accuracy imparting means.

The principal object of this invention is to provide a combination of elements for reducing to a minimum the time of response of the tool head of standard machine tools relative to the feedworks therefor, by isolating the motion transmitting means from the accuracy imparting means so that regardless of errors present in, or subsequently developing in the motion transmitting means, they will be isolated from, and will not affect the accuracy imparting means of the control for the machine.

Another object of this invention is to provide a construction which will permit the application of numerical tape control to a standard machine tool that does not include the specially designed rigid features above referred to and still provides acceptable tolerance accuracies.

Another object of this invention is to provide a construction that will automatically vary the rate of drive for the tool head independently of the feedworks so that the time of response will be reduced to a minimum.

Another object of this invention is to provide a construction in which a servo device is employed to reduce to a minimum the time of response of the tool head movement relatively to the rotation of the feedworks output.

In one aspect of the invention, a tool supporting head may be driven along intersecting paths by separate, rotatable feed shafts. These shafts may be rotated both forwardly and reversely by a feedworks transmission that may be supplied with rotary power by any one of many means. In the manufacture of standard machine tools embodying the above construction, lead screw errors, backlash, shaft wind-up, and other errors due to manufacturing tolerances cause a perceptible, although small, lag between tool head movement and the rotary motion of the shafts at the output of the feedworks transmission. While these errors may not seriously be reflected in the work being machined while the tool is always moving in the same direction, they become very serious when the tool head movement is required to be reversed during a cutting operation, which commonly occurs during continuous path contouring work.

In another aspect of the invention, epicyclic gearing arrangements may be provided between the output of the feedworks and each of the feed shafts wherein one element of each arrangement may be driven by the feedworks, another element may be connected to the feed shaft, and the third element may be adapted to be driven in either direction by a power source independent of the feedworks.

In still another aspect of the invention, the energizing, either forwardly or reversely, of the independent power source may be controlled by a servo mechanism which may include a servo generator that may be driven by the tool head and a servo motor driven from the output of the feedworks. The servo motor may drive an electrical contactor that may be located between reversing contacts which latter may be driven by the output of the feedworks. In this way, should there be no errors between the output of the feedworks and the tool head, the electrical contactor and the two spaced contacts will rotate together with the electrical contactor between, but not in contact with the two spaced contacts. Any discrepancy between the feedworks output and the tool head movement will cause the electrical contactor to engage one of the contacts, thereby energizing the motor that drives the epicyclic gearing element to impart to the feed shaft a rotary motion independent of the feedworks and in a direction to overcome the error and thereby increase the response of head movement relatively to feedworks output.

The above, other objects and novel features of the control will become apparent from the following specification and accompanying drawing which is merely exemplary.

In the drawing:

The FIGURE is a schematic layer out of a machine tool head including a block diagram of a tape control system therefor, and to which the principles of the invention have been applied.

Referring to the drawing, the principles of the invention are shown as applied to a tool supporting member 10 adapted to be mounted on a saddle 11 for reciprocative movement along a "Y" axis. The saddle 11 is adapted to be mounted on a crossrail 12 for reciprocative movement along an "X" axis. The crossrail may be cored out to accommodate a nut 13 fixed to the back of the saddle 11, and a feed shaft 14 may be threaded into the nut 13. Accordingly, rotation of shaft 14 in both directions causes reciprocation of the saddle 11 along the crossrail 12.

The back of the member 10 may also be cored out to receive a nut 15 rigidly attached thereto and into which a feed shaft 16 is threaded. A bevel gear 17 may be fixed to the lower end of shaft 16 and it may mesh with a bevel gear 18 splined to a shaft 19. Accordingly, rotation of shaft 19 in both directions will cause reciprocation of member 10 along the "Y" axis.

Rotation of the feed shafts 14 and 19 may be effected by separate feedworks transmissions which in the embodiment disclosed are shown as variable speed hydraulic units 20 and 21, respectively. Since the operation of each feedworks and its corresponding feed shaft is identical, only one will specifically be described. The speed of the hydraulic unit 20 may be controlled by the operation of a servo valve 22 that varies the supply of liquid from a hydraulic supply 23 by means to be described later.

The output shaft 24 of the unit 20 is adapted to drive one element of an epicyclic gearing unit 25. In the embodiment disclosed, the shaft 24 drives the sun gear 26 of the unit 25. An arm 27 may be fixed to feed shaft 14, and it may support planet gears 28 that mesh with sun gear 26. A reactor 29 may include an internal ring gear 30 that meshes with the planet gears 28 and an external worm gear 31 that meshes with a worm 32 that is adapted to be rotated in a forward and a reverse direction by a D.C. motor 33.

From the foregoing it is evident that since the worm 32 and worm gear 31 are self-locking, the shaft 24 drives the feed shaft 14 at base speed when the motor 33 is de-energized. Furthermore, energization of motor 33 in a forward or a reverse direction will increase or decrease the speed of rotation of feed shaft 14 above or below the base speed of the epicyclic gearing arrangement, depending upon the direction in which the reactor 29 is rotated.

The tape control for sending commands to the feedworks 20 may comprise any one of known numerical tape control devices, and in the embodiment disclosed is shown as a continuous contouring type of numerical tape control. Since it forms no part per se of the present invention, it is shown in block diagram form and comprises a tape reader 34 from which the commands on the tape are fed to a temporary storage 35. The incremental values ΔY and ΔX are fed from the temporary storage to a linear interpolator 36. The incremental values of ΔY are fed to a Y-synchronizer 37, while those of ΔX are fed to an X-synchronizer 38.

The outputs of the synchronizers 37 and 38 are fed, respectively, into Y and X error registers 41 and 42 from which signals are fed to Y and X digital to analog converters 43 and 44, respectively.

The outputs of the converters 43 and 44 are fed to Y and X servo amplifiers 45 and 46. The output of the servo amplifier 46 is employed to operate a torque motor 47 that controls servo valve 22 in effecting the supply of liquid from supply 23 to the hydraulic feedworks motor 20 in accordance with command information on the tape passing through the tape reader 34.

The output shaft 24 of feedworks 20 has a gear 48 fixed thereto that meshes with gearing 49 connected to a pulse generator 50. The function of the pulse generator is to produce pulses in response to the operation of shaft 24, which pulses are fed back to the X synchronizer 38 where they are employed to be compared with the original tape commands and to maintain the rotation of shaft 24 in conformance with the commands issuing from the tape reader 34.

The described numerical tape control is a closed loop arrangement, the electrical accuracy of which is of a very high order. This is facilitated by the fact that the pulse generator 50 is close-coupled to the shaft 24 and practically no mechanical errors occur between shaft 24 and generator 50. Should the pulse generator not be responsive to the rotation of shaft 24 at the output of feedworks 20, but be responsive, for example, to the movement of head 10 along the crossrail 12, the mechanical errors between shaft 24 and head 10 would produce an arrangement that would continuously hunt and, therefore, would fail to provide the accuracies required, particularly in continuous contouring operations.

In the present invention, this has been overcome by providing a separate servo system between shaft 24 and head 10 for operating the motor 33 which, in turn, imparts a variation in the rotation of feed shaft 14 independently of the feedworks 20. This servo mechanism may comprise a ring 51 containing two spaced contacts 52 and 53. Ring 51 may have fixed to it a bevel gear 54 that meshes with a bevel gear 55 that is driven by gearing 56 that meshes with gear 48 on shaft 24.

A finger contactor 57 may be fixed to a shaft 58 that is driven by a servo motor 59. The servo motor 59 is electrically connected to a servo generator 60 mounted on saddle 11, and a pinion 61 thereon meshes with an accurately formed rack 62 stationarily mounted on the crossrail 12. Movement of head 10 along the X-axis causes rotation of the rotor of the generator 60 which, in a known manner, effects exactly the same rotation of the rotor of the motor 59 and hence the rotation of finger contactor 57.

The gearing between shaft 24 and ring 51 as well as the pitch of the feed shaft 14 and the gearing of the epicyclic arrangement are such that a revolution of ring 51 corresponds to a revolution of finger contactor 57 so that, should there be no mechanical error between shaft 24 and head 10, the ring 51 and finger 57 rotate together, with the finger 57 between contacts 52 and 53 but in contact with neither.

However, should mechanical errors be present, which invariably will be the case, the contactor finger 57 will engage one or the other of contacts 52 or 53 on ring 51. Assume that finger 57 engages contact 52, F relay 63 becomes energized closing F contacts 64, energizing motor 33 to cause its rotation as well as that of reactor 29 in a direction to cause feed shaft 14 to rotate at a speed above or below base speed of the epicyclic gearing arrangement to maintain the movement of head 10 in phase with the rotation of shaft 24. When this has been achieved, the finger 57 moves away from contact 52 to its normal position between contacts 52 and 53 until the movement of head 10 becomes out of phase with the rotation of shaft 24.

The sort of mechanical errors referred to are such that a very small correcting movement of reactor 29 is required to overcome them to thereby reduce the lag in response of head movement relatively to that of shaft 24 to a minimum. The order of such corrective movement may be no greater than one-eighth of an inch per foot of head movement. Accordingly, the frequency response of the servo system including generator 60 and motor 59 will be very low, thus providing a system which will tend to inhibit hunting.

There may be provided corresponding components for the Y-axis operation of head 10 and the preceding text applies equally well to such components, which latter, in the drawing, have been identified with corresponding numbers that have been primed.

Although the various features of the improved control have been shown and described in detail to fully disclose one embodiment of the invention, it will be evident that changes may be made in such details and certain features may be used without others without departing from the principles of the invention.

What is claimed is:

1. In a machine tool, a tool supporting head mounted for movement along an axis; a rotatable shaft for causing said head to move in either direction along said axis; feedworks means for rotating said shaft; epicyclic gearing means between said feedworks and its rotatable shaft, separate elements of said epicyclic gearing arrangement being connected, respectively, to the feedworks and the rotatable shaft; reversible power means separate from said feedworks, connected to the third element of said epicyclic gearing arrangement; and means for rendering effective the separate power means for said epicyclic gearing arrangement in response to the lag in movement of said head relatively to the output of the feedworks connected to said epicyclic gearing arrangement.

2. In a machine tool, a tool supporting head mounted for movement along an axis; a rotatable shaft for causing said head to move in either direction along said axis; feedworks means for rotating said shaft; epicyclic gearing means between said feedworks and its rotatable shaft, separate elements of said epicyclic gearing arrangement being connected, respectively, to the feedworks and the rotatable shaft; reversible power means separate from said feedworks, connected to the third element of said epicyclic gearing arrangement; and servo means between said head and said feedworks for rendering effective said reversible power means for said epicyclic gearing arrangement in response to the lag in movement of said head relatively to the output of the feedworks connected to said epicyclic gearing arrangement.

3. In a machine tool, a tool supporting head mounted for movement along an axis; a rotatable shaft for causing said head to move in either direction along said axis; feedworks means for rotating said shaft; a servo system for controlling the operation of said feedworks and including a feedback from the output of said feedworks; epicyclic gearing means between said head and said feedworks means; separate power means independent of said feedworks for operating an element of said epicyclic gearing means; and another servo system between the output of said feedworks and said head for controlling the operation of said separate power means.

4. In a machine tool, a tool supporting head mounted for movement along an axis; first power means for causing the movement of said head in either direction along said axis; numerical tape control means for controlling the operation of said first power means; an error detecting feedback means from the output of said first power means to said numerical tape control means; an epicyclic gearing arrangement between said first power means and said head; second power means for controlling the operation of said epicyclic gearing arrangement; and means for rendering effective said second power means in response to the lag in movement of said head relatively to the output of said first power means.

5. In a machine tool, a tool supporting head mounted for movement along an axis; first power means for causing the movement of said head in either direction along said axis; numerical tape control means for controlling the operation of said first power means; an error detecting feedback means from the output of said first power means to said numerical tape control means; an epicyclic gearing arrangement between said first power means and said head; second power means for controlling the operation of said epicyclic gearing arrangement; and a servo means between said head and said first power means for rendering effective said second power means in response to the lag in movement of said head relatively to the output of said first power means.

References Cited in the file of this patent
UNITED STATES PATENTS

| | | |
|---|---|---|
| 2,352,183 | Bullard | June 27, 1944 |
| 2,780,893 | Seborg et al. | Feb. 12, 1957 |
| 2,911,760 | Barradell-Smith | Nov. 10, 1959 |
| 2,913,964 | Mann | Nov. 24, 1959 |
| 2,927,258 | Lippel | Mar. 1, 1960 |
| 3,024,708 | Breen et al. | Mar. 13, 1962 |